(12) United States Patent
Wilson

(10) Patent No.: US 7,234,042 B1
(45) Date of Patent: Jun. 19, 2007

(54) IDENTIFICATION BIT AT A PREDETERMINED INSTRUCTION LOCATION THAT INDICATES WHETHER THE INSTRUCTION IS ONE OR TWO INDEPENDENT OPERATIONS AND INDICATES THE NATURE THE OPERATIONS EXECUTING IN TWO PROCESSING CHANNELS

(75) Inventor: Sophie Wilson, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/395,294

(22) Filed: Sep. 13, 1999

(30) Foreign Application Priority Data

Jul. 14, 1999 (GB) ................................. 9916566.4

(51) Int. Cl.
*G06F 9/30* (2006.01)

(52) U.S. Cl. .......................................... 712/215; 712/24

(58) Field of Classification Search ................ 712/24, 712/215
See application file for complete search history.

(56) References Cited

U.S. PATENT DOCUMENTS

| 5,051,885 A | * | 9/1991 | Yates et al. ................. 712/215 |
| 5,355,460 A | * | 10/1994 | Eickemeyer et al. ........ 712/215 |
| 5,761,470 A | * | 6/1998 | Yoshida ....................... 712/210 |
| 5,870,619 A |   | 2/1999 | Wilkinson et al. ............ 712/20 |
| 5,878,241 A |   | 3/1999 | Wilkinson et al. .......... 712/203 |
| 5,966,528 A |   | 10/1999 | Wilkinson et al. .......... 712/222 |
| 6,076,154 A | * | 6/2000 | Van Eijndhoven et al. . 712/206 |
| 6,230,180 B1 | * | 5/2001 | Mohamed .................... 708/523 |
| 6,292,845 B1 | * | 9/2001 | Fleck et al. ................... 710/38 |
| 6,317,820 B1 | * | 11/2001 | Shiell et al. ................ 712/200 |
| 6,697,774 B1 | * | 2/2004 | Panesar ....................... 703/21 |

FOREIGN PATENT DOCUMENTS

JP 2000215061 A * 8/2000
JP 2001142692 A * 5/2001

* cited by examiner

*Primary Examiner*—Fritz Fleming
*Assistant Examiner*—Tonia L. Meonske
(74) *Attorney, Agent, or Firm*—Sterne Kessler Goldstein & Fox PLLC

(57) ABSTRACT

An instruction set for a computer is described which includes instructions having a common predetermined bit length. That predetermined bit length can define a single operation or two independent operations. The instruction includes designated bits at predetermined bit locations which identify whether the instruction is a long instruction or a dual operation instruction.

11 Claims, 4 Drawing Sheets

| IDbit | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 | |
|---|---|---|---|---|---|---|---|---|---|---|---|---|---|---|---|---|---|---|---|---|---|---|---|---|---|---|---|---|---|---|---|---|---|
| M | G | OPCODE | | | | | | S | TST | | | SRC2 | | | | | | SRC1 | | | | | | DST | | | | | (1) |
| M | G | OPCODE | | | | | | TST | | | | IMMED | | | | | | | | | | | | DST | | | | | (2) |
| M | G | OPCODE | | | | | | S | TST | | | SRC2 | | | | | | SRC1 | | | | | | SIGN | M REG | | | | (3) |
| M | G | OPCODE | | | | | | S | TST | | | SHIFT | | M REG | | | | SRC1 | | | | | | DST | | | | | (4) |
| M | G | OPCODE | | | | | | S | TST | | | SRC2 | | | | | | SRC1 | | | | | | DST | | | | | (5) |
| M | | OPCODE | | | | | | T | | IMMEDIATE OFFSET | | | | | | | | BASE REG | | | | | | DST | | | | | (6) |
| M | | OPCODE | | | | | | INDX OP | | T | | INDX REG | | | | | | BASE REG | | | | | | DST | | | | | (7) |

FIG. 3

| BIT | 31(M) | 30(G) | 29(G) |
|---|---|---|---|
| REGISTER/ IMMEDIATE | 1 | 0 | X |
| REGISTER/ REGISTER | 1 | 1 | 0 |
| MAC OPERATIONS | 1 | 1 | 1 |

FIG. 4

```
-63-62-----53--50-49-44-43-38-37--32-31-29-28----18-17-12-11--6-5----0-
|0 |OPERATION | BRANCH CONDITION |IMMED |1111 |  IMMEDIATE    | REG    | L1
|  |          |                  |      |     |               |        |
|0 |OPERATION |S|TST |SRC4 |SRC3 |IMMED |DEST2|1111 |RESERVED |SRC2 |SRC1 | DEST1 | L2
|  |          | |    |     |     |      |     |     |         |     |     |       |
|0 |OPERATION |S|TST | IMMEDIATE HI16|  |1111 | IMMEDIATE OW16 |SRC1 | DEST1 | L3
```

FIG. 5

IDENTIFICATION BIT AT A PREDETERMINED INSTRUCTION LOCATION THAT INDICATES WHETHER THE INSTRUCTION IS ONE OR TWO INDEPENDENT OPERATIONS AND INDICATES THE NATURE THE OPERATIONS EXECUTING IN TWO PROCESSING CHANNELS

FIELD OF THE INVENTION

The present invention relates to an instruction set for a computer. In particular the invention provides a computer system, a method of operating the same and a computer program product which makes use of the instruction set.

BACKGROUND TO THE INVENTION

A variety of different instruction sets for computer systems are known. In a basic RISC instruction set, all instructions have the same fixed length. Instructions having variable lengths, for example, are known where the length of the instruction is encoded within the instruction. This allows simple instructions to be shorter and thus code to be compressed in the program memory. However, it creates alignment problems on instruction fetches and decodes.

In another arrangement, a number of instructions are retrieved from memory in each instruction fetch, each instruction fetch having a certain bit length and each individual instruction (slot) having a certain bit length (so-called VLIW instructions). This overcomes alignment difficulties, because the fetch unit always fetches the same number of instructions. However the length of each instruction, and therefore the potential complexity of the instruction, is limited.

It is an object of the present invention to improve the flexibility of an instruction set, while maintaining fixed length instructions.

SUMMARY OF THE INVENTION

According to one aspect of the invention there is provided a computer system comprising: a decode unit for decoding instructions fetched from a memory holding a sequence of instructions, all instructions in the sequence having the same predetermined bit length; and first and second processing channels, each channel comprising a plurality of functional units, at least one of said functional units in each channel being a data processing unit and at least one other of said functional units in each channel being a memory access unit; wherein the decode unit is operable to detect for each instruction of said predetermined bit length whether the instruction defines a single operation or two independent operations and to control the X and Y channels in dependence on said detection.

According to another aspect of the invention there is provided a method of operating a computer system which comprises first and second processing channels each having a plurality of functional units including at least one data processing unit and one memory access unit, the method comprising: decoding an instruction having a predetermined bit length to detect whether that instruction defines a single operation or two independent operations; where the instruction defines two independent operations, supplying one of the operations to the first processing channel and the other of the operations to the second processing channel whereby the operations are executed simultaneously; and when the instruction defines a single operation, controlling the first and second processing channels to cooperate to implement said single operation.

According to another aspect of the present invention there is provided a computer program product comprising program code means which include a sequence of instructions all having the same predetermined bit length, said instructions including long instructions wherein said predetermined bit length defines a single operation and dual operation instructions wherein said predetermined bit length defines two independent operations, wherein the computer program product is adapted to run on a computer such that the long instructions control the resources of the computer in a first way, and the dual operation instructions control the resources of the computer in a second way.

According to a further aspect of the invention there is provided a method of operating a computer system which comprises first and second processing channels each having a plurality of functional units including at least one data processing unit and one memory access unit, the method comprising: fetching a sequence of instructions from a program memory, all said instructions having the same predetermined bit length and containing a set of designated bits at predetermined bit locations within said bit length; decoding each instruction, said decoding step including reading the values of said designated bits to determine:

a) whether the instruction defines a single operation or two independent operations; and b) where the instruction defines two independent operations, the nature of each of those operations selected at least from a data processing category of operation and a memory access category of operation.

A still further aspect of the invention provides computer program product comprising program code means which include a sequence of the instructions all having the same predetermined bit length, said instructions including long instructions wherein said predetermined bit length defines a single operation and dual operation instructions wherein said predetermined bit length defines two independent operations, said instructions including a set of identification bits at designated bit locations within the instruction, wherein the computer program product is adapted to run on a computer such that said identification bits are adapted to cooperate with a decode unit of the computer to designate whether:

a) the instruction is a long instruction or a dual operation instruction; and b) in the case of a dual operation instruction, the nature of each operation in the instruction selected from a data processing category and a memory access category.

According to one main concept therefore underlying the present invention, programs are written as a sequence of instructions all having the same predetermined bit length, dramatically simplifying fetch and decode hardware. An instruction can be a long instruction defining a single operation, or a dual operation instruction defining two independent operations. When a long instruction defines a single operation, this can be a complicated operation due to the extended number of bits.

According to another main concept underlying aspects of the invention, each instruction includes a set of identification bits at designated bit locations within the instruction. These identification bits have a dual purpose. The same set of bits identify the type of operations within a dual operation instruction, selected from at least a data processing category and a memory access category. In addition, the same set of identification bits denote whether the instruction is a long instruction or a dual operation instruction.

Thus, according to one described embodiment, two bits allow four operation combinations to be specified, by treating the combination of an X channel data processing operation with a Y channel memory access operation as having the same semantics as a X channel memory access operation and a Y channel data processing operation. This allows a combination of the two bits to be reserved to denote a long instruction. This effectively allows five "different" encodings to be denoted by four possible bit combinations.

Where the data processing category of instructions divided up into a number of data processing sub-types, it is again possible to reserve a combination of bits to denote a long instruction, by treating a particular combination of data processing sub-category type and memory access type in the X and Y channels as having the same combination semantics.

For a better understanding of the present invention and to show how the same may be carried into effect, reference will now be made by way of example to the accompanying drawings.

BRIEF DESCRIPTION OF THE DRAWINGS

FIG. 3 illustrates a number of different 32 bit instruction formats;

FIG. 4 is a table illustrating the encoding of different data processing operations; and FIG. 5 is a diagram illustrating a number of different 64 bit instruction formats.

DESCRIPTION OF THE PREFERRED EMBODIMENT

Figure 1:
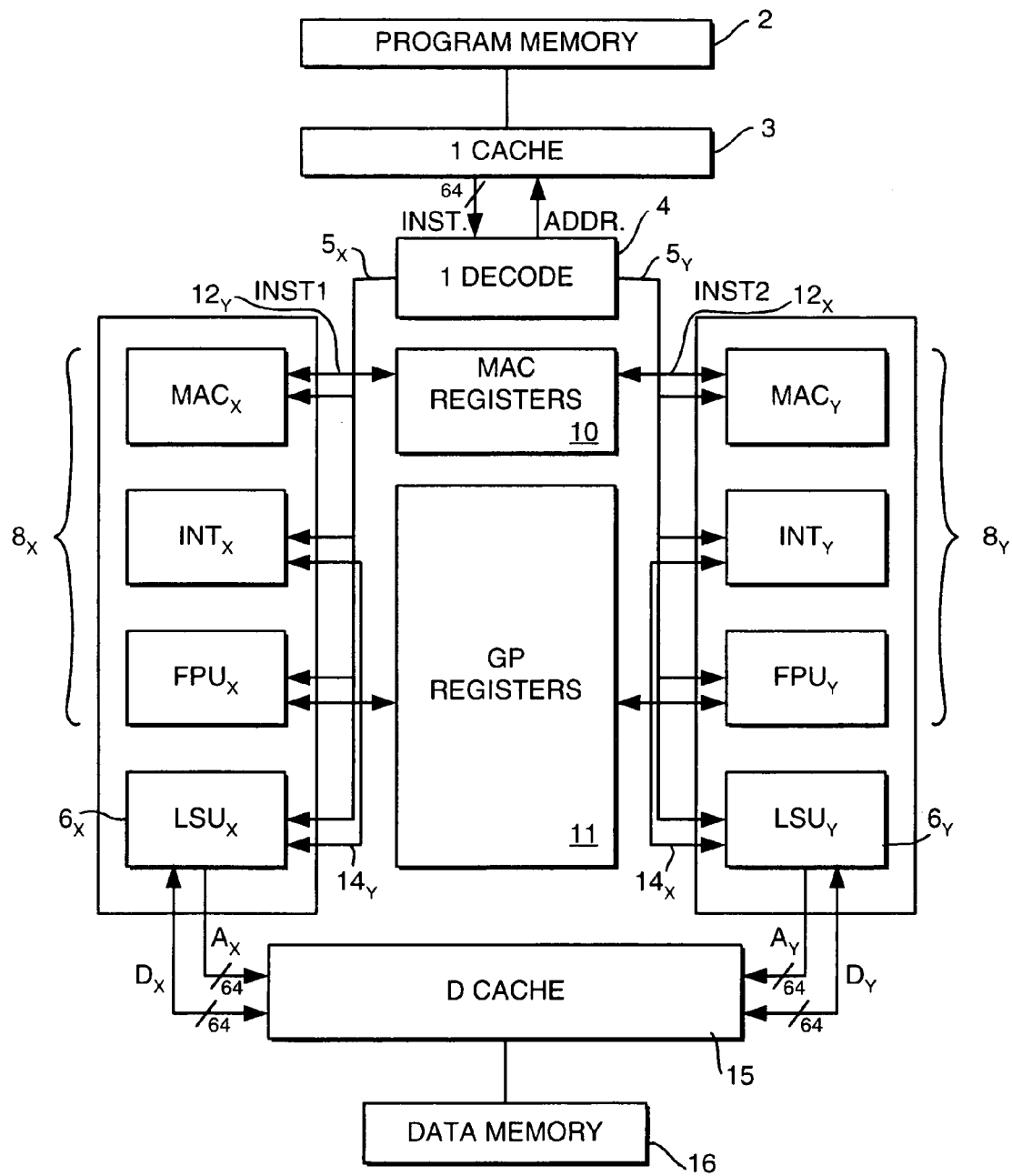
FIG. 1 is a schematic block diagram illustrating a processor.

The computer system described herein is schematically illustrated in FIG. 1 is a schematic diagram of the system. In FIG. 1, reference numeral 2 denotes a program memory which holds programs in the form of a plurality of instructions. The program memory 2 is connected to an instruction cache 3 which is connected to instruction fetch/decode circuitry 4. The fetch/decode circuitry issues addresses to the program memory and receives on each fetch operation a 64 bit instruction from the program memory 2 (or cache 3). As described more fully in the following, each 64 bit instruction can define two operations or a single operation. The decode unit 4 evaluates the opcode and transmits the appropriate control signals along X and Y channels $5_x, 5_y$. Each channel comprises a SIMD execution unit $8_x, 8_y$ which includes three data processing units, MAC, INT and FPU and a load/store unit LSU 6. Each data processing unit MAC, INT and FPU and the load/store units LSU operate on a single instruction multiple data (SIMD) principle according to the SIMD lane expressed in the instruction according to the following protocol which defines the degree of packing of objects for packed data processing operations:

| (B) | 8 bit objects ($b_0 \ldots b_7$) |
| (H) | 16 bit objects ($h_0 \ldots h_3$) |
| (W) | 32 bit objects ($w_0 \ldots w_1$) |
| (L) | 64 bit objects (l) |

-continued

| (S) | 32 bit floating point |
| (D) | 64 bit floating point |

For each channel $5_x, 5_y$ if the instruction defines a data processing operation it is supplied to the appropriate data processing unit MAC, INT or FPU and if it defines a load/store operation it is supplied to the load/store unit LSU. Data values are loaded to and from the MAC data processing units into and out of a common register file 10 which includes sixteen 64 bit special purpose registers along register access paths $12_x, 12_y$. Data values are loaded to and from the INT and FPU data processing units and the load/store units LSU into and out of a second register file 11 which includes sixty-four 64-bit general purpose registers. Register access paths $14_x, 14_y$ are provided for these accesses. The program counter PC which indicates the current instruction can be read via one of the general purpose registers (the PC register). Another one of the general purpose registers constitutes a control and status register.

Each register access path 12, 14 carries three addresses from the accessing unit, two source addresses SRC1, SRC2 and a destination address DST. In the case of data processing operations, the source addresses SRC1, SRC2 define registers in the register files 10,11 which hold source operands for processing by the data processing unit. The destination address DST identifies a destination register into which a result of data processing will be placed. The operands and results are conveyed between the register file 10 or 11 and the respective data processing unit via the access paths 12, 14. In the case of load/store operations, the instruction formats allow memory access addresses $A_x, A_y$ to be formulated from data values held in the registers as described in our copending application (GB-9916564.9, entitled An Instruction Set for a Computer), co-pending U.S. application Ser. No. 09/395,295. The load/store units access a common address space in the form of a data memory 16 via a dual ported data cache DCACHE 15. For this purpose, each load/store unit has a 64 bit data bus Dx,Dy and a 64 bit address bus Ax,Ay.

Figure 2A:
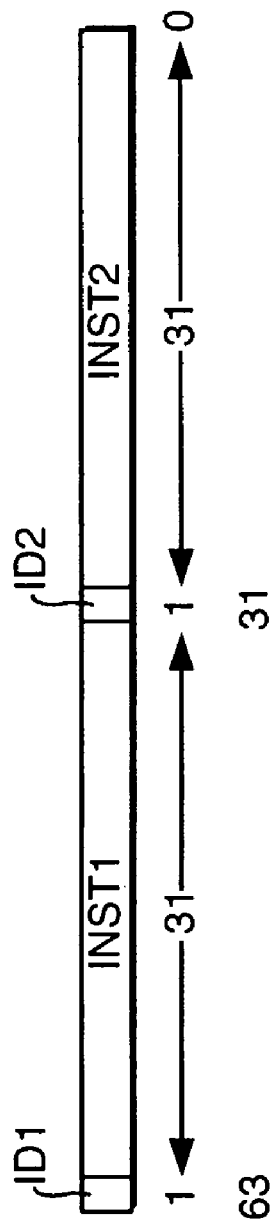
FIG. 2 is a diagram illustrating the encoding of two "packed" instructions.

The architecture supports two types of instruction, so called "long instructions" and "dual operation instructions" Each 64 bit dual operation instruction defines two 31 bit operations in the manner illustrated in FIG. 2a. That is, each 64 bit sequence contains two 32 bit instruction portions labelled INST1 and INST2. Each instruction also includes a designated set of identification bits which identify the type of each operation. There are two such bits in FIG. 2a at bit locations 31 and 63 denoted ID1 and ID2 in FIG. 2a. In this embodiment operations are divided into data processing (DP) types or a load/store (LD/ST) types. The allowed combinations are two data processing operations (ID1,ID2 both set to "0"), two load/store operations (ID1,ID2 both set to "1") or one data processing and one load/store operation (ID1=0,ID2=1).

Figure 2B:
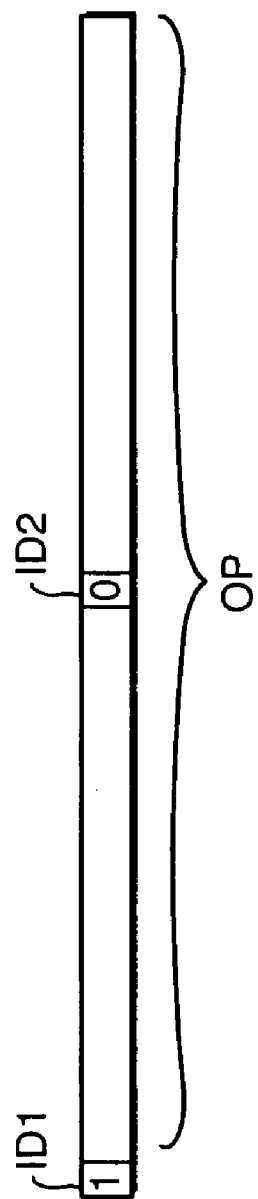

The combination ID1=1,ID2=0 is used to denote a long instruction. A long instruction has 64 bits and defines a single operation OP as illustrated in FIG. 2b.

In the above embodiment, it is assumed that there are only two identification bits (ID1,ID2—bits 31 and 63 of the 64 bit instruction). In fact, a greater number of possibilities can be implemented by increasing the number of these bits.

FIG. 3 illustrates a number of basic formats for the 32 bit instruction portions of dual operation instructions according to a second embodiment. Each 32 bit operation requires the resources of one load/store unit, or one or more of the SIMD data processing units (MAC, INT, FPU) to execute. Thus, normally, two 32 bit operations can execute simultaneously, one in each of the X and Y channels.

Formats (1) to (5) define data processing operations. There are three identification bits, M (bit 31) and G (bits 29 and 30). These three bits can denote the nature of the data processing operation as in FIG. 4.

If the bit M is set to 0, this denotes a load/store operation as before. In this arrangement, the combination INST1 M=1, G=11, INST2 M=0 therefore indicates an X-channel MAC operation and a Y-channel load/store. The combination INST1 M=0, INST2 M=1, G=11 denotes a X-channel load/store and a Y-channel MAC operation. As far as the machine is concerned, this is the same job as the earlier combination. Therefore the code INST1 M=0, INST2 M=1 G=11 can be used to denote a long operation, and the code INST1 M=1 G=11, INST2 M=0 is used for both MAC/load/store combinations.

A number of basic formats for a long instruction are shown in FIG. 5. These include format L1 for implementing branches, having a register field Reg (bits 0 to 5), an immediate field (bits 6 to 28, 32 to 37), a branch condition field (bits 38 to 53) and an opcode field (bits 54 to 62). In all the long formats, bit 63 (0) and bits 29 to 31 (1 1 1) are the identification bits denoting that the instruction is a long instruction, as described above. The branch instruction takes a signed offset, specified in the immediate field and adds it to the PC which is held in the PC register in the register file 11 and accessed by the register field. The PC register then holds the new PC.

The same format L1 can also be used to implement an instruction to load or store a block of memory. These instructions are called LDM/SDM. This instruction block loads a bank of registers from a base address defined in the register addressed by the register field (bits 0 to 5). The 32 bit immediate value holds a 16 bit bit-mask (zero padded) which identifies which registers are to be stored in the specified banks. The bank is specified in the opcode of the instruction, banks being defined as follows: Bank0 ($R_0$ ... $R_{15}$), Bank1 ($R_{16}$ ... $R_{31}$), Bank2 ($R_{32}$ ... $R_{47}$), Bank3 ($R_{48}$ ... $R_{63}$), and Bankm ($M_0$ ... $M_{15}$—that is the special registers in the register file 10). Registers $R_0$ to $R_{64}$ are in the general purpose register file 10. The register defined in bits 0 to 5 of the instruction contains the memory location from which the transfer is to take place. The PC register cannot be used as a base register, but may be included as one of the registers to be loaded. The advantages gained by using a long instruction is that a bigger branch displacement range and more complicated conditions for branching can be provided.

The format L2 allows register to register data processing operations and includes fields allowing four source registers Src1,Src1,Src3,Src4 and two destination registers Dest1, Dest2 to be accessed by the single instruction. The operation defined in the opcode field is implemented on the contents of the pair of registers Src1,Src2, and the pair Src3,Src4 and the results loaded into the respective destination registers Dest1 (for pair Src1,Src2) and Dest2 (for pair Src3,Src4). The operation uses the same functional unit resource in both the X and Y channels, e.g. $MAC_{x,y}$; $FPU_{x,y}$; or $INT_{x,y}$.

For example, one instruction using format L2 is the instruction HVINT, for example $HVINT_{YB}$ which bilinearly interpolates luminance bytes on a SIMD basis. The instruction interpolates one row of 16 bytes from two rows of 17 bytes. The source data is <pair>,<reg>,<pair>,<reg>, giving the two rows of 17 bytes: each <pair> provides the first 16 bytes, each <reg> provides the last byte. Each new byte i in the output is interpolated from byte i and byte i+1 in the first row and byte i and byte i+1 in the second row. Such an instruction could not be fitted into a conventional three register operand instruction set.

The format L3 allows register/immediate data processing operations. This instruction defines a 32 bit immediate in high (bits 32 to 47) and low (bits 13 to 29) portions, plus a source register (bits 6 to 11) and a Dest register (bits 0 to 5). The following set of instructions are defined:

| | |
|---|---|
| adib | add immediate bytes (all 8 of them) |
| adih | add immediate half words (all 4 of them) |
| adiw | add immediate words (both) |
| adiwhi | add immediate high word |
| adiwlo | add immediate low word |
| dir | hardware directive - fiddle with something inside the CPU (MMU, LD/ST unit) |
| svc | supervisor call - protected gain privilege |

Operation of the processor with respect to the different instructions (dual operation and long) will now be described. As already mentioned above, each fetch from the program memory 2 fetches a 64 bit word. This is supplied to the decode unit 4 along the line marked INST in FIG. 1. The decode unit examines bits 29 to 31 and 63 to determine the nature of the incoming instruction. If it detects that the instruction contains two independent 32 bit operations, the opcode of each 32 bit portion is supplied to the respective required unit in the X and Y channel. For example, a 64 bit word from memory can contain a 32 bit load/store operation and a 32 bit data processing operation. In that case, the load/store unit in the X channel 6x will be accessed by that portion of the instruction, and the appropriate data processing units $MAC_y$, $INST_y$, $FPU_y$ in the data processing side 8$_y$ in the Y-channel will be accessed by the opcode of the second 32 bit portion. The load/store unit $LSU_x$ in the X-channel and the relevant data processing unit 8$_y$ in the Y-channel then operate in parallel, simultaneously accessing the dual ported register files 10,11 as required.

When the decode unit detects the combination denoting a long instruction at bits 29 to 31 and bit 63, the machine operates differently depending on the nature of the instruction. For register/register instruction format L2, the single opcode portion of the 64 bit word is duplicated into the X and Y-channels along path 5$_x$,5$_y$ to instruct the relevant data processing units in each of the X and Y channels simultaneously to perform the same operation. However, the registers are differently identified, each of the X and Y-channels receiving information identifying their particular registers such that the functional unit in the X channel accesses its registers (Src1, Src2, Dest1) and the functional unit in the Y channel accesses its registers (Src3, Src4, Dest2). Thus, format L2 in FIG. 5 allows register to register data processing. For format L3 which allows for register/immediate data processing operations, a 64 bit word identifies a destination register Dest1 and a source register Src1 and defines a 32 bit immediate value. In high and low portions. For the adib/h/w instructions, the immediate value is duplicated to make a 64 bit value which can be added to the 64 bit contents of the source register Src1 and the results loaded into the destination register Dest1.

Thus, the 64 bit instructions are able to access the full resources of the machine to implement special operations, or can define operations which would be outside the ambit of an instruction having a length of only 32 bits.

What is claimed is:

1. A system to process very long instruction words (VLIWs), the system comprising:
   a decode unit to decode an instruction of a VLIW received during an instruction fetch, wherein all instructions of the VLIW have the same predetermined instruction bit length; and
   first and second processing channels, each processing channel including a plurality of functional units, at least one of the functional units of each processing channel being a data processing unit and at least one other of the functional units of each processing channel being a memory access unit;
   wherein the decode unit is operable to determine whether the instruction defines a single operation or two independent operations based on at least one identification bit at at least one predetermined bit location in the instruction and to control the first and second processing channels based on the determination;
   wherein the decode unit is operable to identify certain combinations of the two independent operations based on the at least one identification bit; and
   wherein a first combination denotes two data processing operations, a second combination denotes two memory access operations, a third combination denotes a data processing operation and a memory access operation, and a fourth combination denotes a long instruction.

2. The system according to claim 1, wherein, when the decode unit determines that the instruction defines two independent operations, the decode unit is operable to control the first channel to implement one of the two independent operations and the second channel to implement the other of the two independent operations, and wherein the first and second channels execute their respective independent operations simultaneously.

3. The system according to claim 1, wherein, when the decode unit determines that the instruction defines a single operation, the decode unit is operable to control the first and second processing channels to cooperate to execute the single operation.

4. The system according to claim 1, wherein the first and second processing channels share at least one common register file and are capable of simultaneously accessing the at least one common register file.

5. The system according to claim 1, wherein the instruction has a length of n bits, and the at least one predetermined bit location includes the n/2th bit and the nth bit.

6. A method of operating a system that processes very long instruction words (VLIWs), each instruction of a VLIW having the same predetermined instruction bit length, the method comprising:
   decoding an instruction of the VLIW received during an instruction fetch to determine whether the instruction defines a single operation or two independent operations;
   when the instruction defines two independent operations, supplying one of the independent operations to a first processing channel having a first plurality of functional units including a first data processing unit and a first memory access unit, and supplying the other of the independent operations to a second processing channel having a second plurality of functional units including a second data processing unit and a second memory access unit, wherein the two independent operations are executed simultaneously; and
   when the instruction defines a single operation, controlling the first and second processing channels to cooperate to execute the single operation;
   wherein decoding the instruction includes determining whether the instruction defines the single operation or the two independent operations based on at least one identification bit at at least one predetermined bit location in the instruction; and
   wherein determining whether the instruction defines the single operation or the two independent operations includes determining whether the instruction defines the single operation or the two independent operations based on the at least one identification bit that indicates the nature of the two independent operations when the instruction defines the two independent operations.

7. The method according to claim 6, wherein determining whether the instruction defines the single operation or the two independent operations is based on an n/2th bit and an nth bit of the instruction having n bits.

8. An article comprising a medium for storing commands to enable a processor-based system to:
   process very long instruction word data including very long instruction words (VLIWs), each instruction of a VLIW having the same predetermined instruction bit length, wherein the commands to enable the processor-based system to process the very long instruction word data include commands to enable the processor-based system to decode an instruction of the VLIW received during an instruction fetch to determine whether the instruction defines a single operation or two independent operations based on at least one identification bit at at least one predetermined bit location in the instruction;
   when the instruction defines two independent operations, supply one of the independent operations to a first processing channel and supply the other of the independent operations to a second processing channel, wherein the two independent operations are executed simultaneously, and wherein the at least one identification bit indicates the nature of the two independent operations when the instruction defines the two independent operations; and
   when the instruction defines a single operation, control the first and second processing channels to cooperate to execute the single operation.

9. The article according to claim 8, wherein the commands to enable the processor-based system to decode the instruction include the commands to enable the processor-based system to decode the instruction to determine whether the instruction defines the single operation or the two independent operations based on an n/2th bit and an nth bit of the instruction having n bits.

10. A method of operating a system that processes very long instruction words (VLIWs), each instruction of a VLIW having the same predetermined instruction bit length and at least one identification bit at at least one predetermined bit location in the instruction, the method comprising:
   fetching the VLIW from a program memory;
   decoding each instruction of the VLIW, wherein decoding each instruction includes reading the at least one identification bit of each instruction to determine:
   a) whether the instruction defines a single operation or two independent operations, and
   b) when the instruction defines two independent operations, the nature of each of the two independent operations selected at least from a data processing category of operation and a memory access category of operation; and
   when the instruction defines two independent operations, supplying one of the independent operations to a first processing channel having a first plurality of functional units including a first data processing unit and a first memory access unit and supplying the other of the independent operations to a second processing channel having a second plurality of functional units including a second data processing unit and a second memory access unit, wherein the two independent operations are executed simultaneously.

11. An article comprising a medium for storing commands to enable a processor-based system to:

process very long instruction word data including very long instruction words (VLIWs), each instruction of a VLIW having the same predetermined instruction bit length and at least one identification bit at at least one predetermined bit location in the instruction, wherein the commands to enable the processor-based system to process the very long instruction word data include commands to enable the processor-based system to decode an instruction of the VLIW received during an instruction fetch to determine:

a) whether the instruction defines a single operation or two independent operations based on the at least one identification bit of the instruction, and b) when the instruction defines two independent operations, the nature of each of the two independent operations selected at least from a data processing category of operation and a memory access category of operation, based on the at least one identification bit of the instruction; and when the instruction defines two independent operations, a) supply one of the independent operations to a first processing channel having a first plurality of functional units including a first data processing unit and a first memory access unit, b) supply the other of the independent operations to a second processing channel having a second plurality of functional units including a second data processing unit and a second memory access unit, and c) simultaneously execute the two independent operations.

* * * * *

UNITED STATES PATENT AND TRADEMARK OFFICE
CERTIFICATE OF CORRECTION

| | | |
|---|---|---|
| PATENT NO. | : 7,234,042 B1 | Page 1 of 1 |
| APPLICATION NO. | : 09/395294 | |
| DATED | : June 19, 2007 | |
| INVENTOR(S) | : Sophie Wilson | |

It is certified that error appears in the above-identified patent and that said Letters Patent is hereby corrected as shown below:

The title should be replaced with --Identification Bit At A Predetermined Instruction Location That Indicates Whether The Instruction Is One Or Two Independent Operations And Indicates The Nature Of The Operations Executing In Two Processing Channels--.

Signed and Sealed this

Fourth Day of September, 2007

JON W. DUDAS
*Director of the United States Patent and Trademark Office*